United States Patent

[11] 3,556,534

[72] Inventors Edwin S. Bara; Leonard J. Kobek, Chicago, Ill.

[21] Appl. No. 623,026

[22] Filed Mar. 14, 1967

[45] Patented Jan. 19, 1971

[73] Assignee Webcor, Inc. Chicago, Ill. a corporation of Illinois

[54] AUTOMATIC CONTROL FOR TAPE ACTUATED INSTRUMENTS
20 Claims, 7 Drawing Figs.

[52] U.S. Cl. .......... 274/4, 179/100.2

[51] Int. Cl. .......... G11b 15/00, G11b 21/08

[50] Field of Search .......... 274/4.11; 179/100.2, CA, Z, S, 100.2CA, 5; 242/55.19A, 55.13

[56] References Cited

UNITED STATES PATENTS

| | | | |
|---|---|---|---|
| 3,443,812 | 5/1969 | Atsumi | 274/4 |
| 3,437,762 | 4/1969 | Lear et al | 274/4 |
| 3,373,951 | 3/1968 | Mazoyer | 274/11 |
| 3,009,024 | 11/1961 | Eash | 274/4 |
| 2,908,769 | 10/1959 | Fonda | 179/100.2 |
| 2,898,113 | 8/1959 | Namenyi-Katz | 274/4 |
| 2,840,380 | 6/1958 | Camras | 274/4 |
| 2,595,197 | 4/1952 | Kuhlow | 274/4 |

*Primary Examiner*—Harry N. Haroian
*Attorney*—Harbaugh and Thomas

ABSTRACT: Automatic control for tape players using a continuous tape cartridge having a tape-actuated solenoid to trip a release lever allowing a pinch roller to pass between the tape-driving capstan and a spring-loaded pivotal lever-pawl, movement of the pawl rotates a step wheel from which is mounted the pickup head for vertical and parallel movement to the next track on the tape, or if the preselected number of tracks of the tape is completed a latch drops into alignment with the pawl and the cartridge is ejected, automatically shutting off the unit. A manual selector rotates the step wheel to position the pickup head at any desired track through sequential stepping and the circuit is arranged for repeat play, automatic play or play of a selected track set by a manual selector.

INVENTORS
EDWIN S. BARA & LEONARD J. KOBEK
By Harbaugh & Thomas
Attorneys

INVENTORS
EDWIN S. BARA & LEONARD J. KOBEK
By Harbaugh & Thomas
Attorneys

AUTOMATIC CONTROL FOR TAPE ACTUATED INSTRUMENTS

This invention relates to several improvements in tape actuated instruments, particularly instruments adapted to utilize multitrack or channel magnetic tape in the recordation and reproduction of sound. More specifically this invention relates to the provision of means to maintain parallel movement between the pickup head or recording head and the tape surface, means to manually or automatically eject the tape cartridge, means to selectively or repeatedly play the tracks on the tape, means to automatically shut off the machine and automatically move the pickup head from track to track in combination with track indicator means and visual indicia therefor. A feature of this invention is the provision of a mechanism whereby the relative movement of the pickup head and tape is maintained in the same plane through the vertical lift mechanism in conjunction with the driving action of a pinch-roller and spring-actuated pawl so that the power requirements and the noise level during operation are reduced. Although the invention will be described in relation to a device for reproducing the sound recorded on a magnetic tape as may be employed in an 8-track stereo cartridge player, one skilled in the art will recognize that the improvements disclosed herein are applicable to computers, tape recording instruments and tape players using continuous cartridge or discontinuous reel type tapes. In one embodiment of this invention the pinch-roller means are adapted to automatically shutoff a machine using a reel type tape in the event of breakage of the tape or accidental unwinding of the tape from either reel.

Accordingly, a primary object of this invention is to provide means for automatic control of tape actuated machines to facilitate their use and increase their utility, speed of operation and enjoyment.

An object of this invention is to provide an automatic tape actuated machine characterized by a reduction in power requirements and low noise level.

Another object of this invention is to provide means for maintaining parallel movement between the pickup head and the surface of the tape to reduce twist strain of the tape and assure fidelity of sound reproduction.

A further object of this invention is to provide in a tape cartridge player means to automatically move the pickup head from track to track, play any track a desired number of times or play only selected tracks of a multitrack tape.

Another object of this invention is to provide means whereby the insertion of the cartridge in a stereo cartridge player actuates the machine and the cartridge is automatically ejected after a preselected number of tracks have been played with further provision for a manual override to eject the cartridge and stop the play at any time.

Still a further object is to provide a detent guide and lock-in-place mechanism for the cartridge to place the player in "ON" position with the cartridge therein, a four-position manually controlled pickup head shifting mechanism; an automatic pickup head shifting mechanism which parallels the manual mechanism; an automatic cartridge ejector mechanism which operates parallel to the shifting mechanisms after one or more tracks have been played, to simultaneously eject the cartridge and shut off the machine, and a repeater control allowing repetitive play of a selected track.

Another object of this invention is to provide a visual indicator for the track being played or about to be played, means to shift the head to a desired track with the machine in "ON" or "OFF" position and provision for both manual and automatic operation.

And another object of this invention is to provide an automatic tape player wherein when the preselected number of continuous playings of the tracks on the tape has been played, the tape cartridge or pack is automatically ejected and when repeat play is selected the unit continues to play without ejecting the cartridge, yet a manual cartridge ejector paralleling the automatic ejector allows ejection of the cartridge and the placing of the machine in "OFF" position at any desired time.

The features and advantages of this invention are present in a self contained deck and in various ways; can be utilized as a cartridge player deck with a preamplification system; in a fully contained tape player; in a cartridge record deck with a preamplification system; a fully self-contained cartridge tape recorder; or, in an automatic type unit, with a DC or AC motor drive, omitting, if desired, one or more features. Other objects and features of this invention will appear hereinafter.

The invention is best understood by reference to the accompanying drawings showing a preferred form of construction, by way of illustration, and in which.

Figures 1, 6:
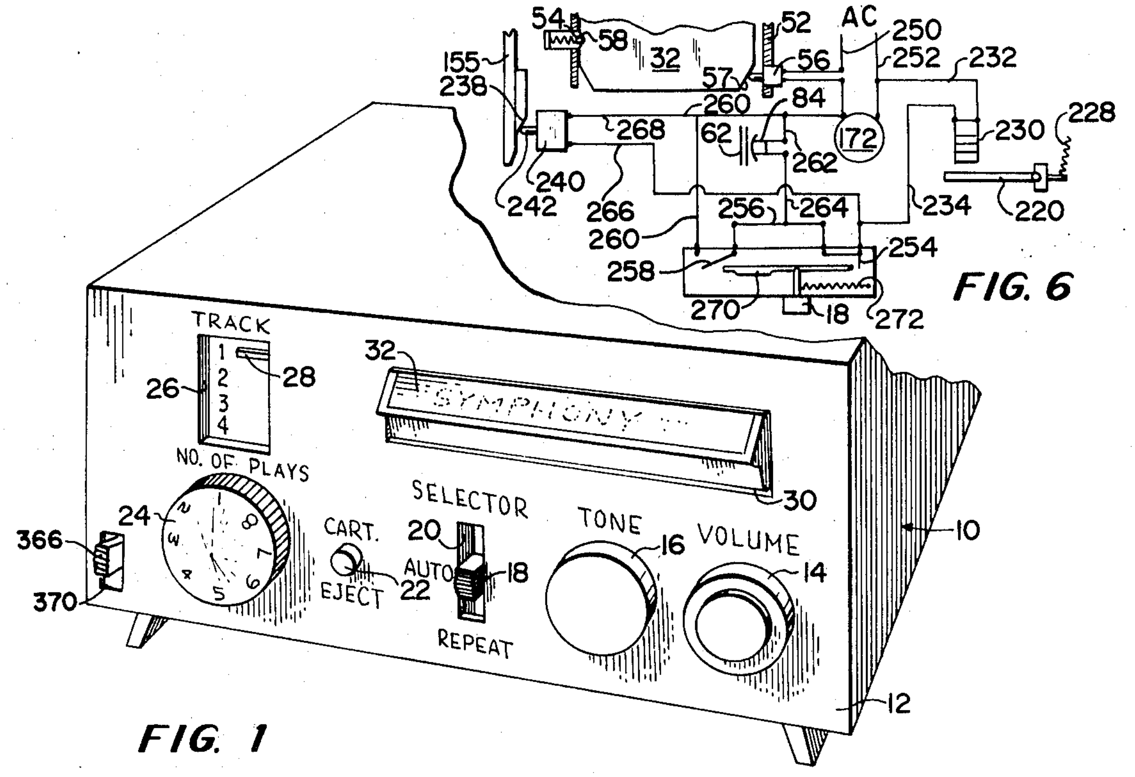
FIG. 1 is a perspective view of a cartridge type tape player, showing the control front and indicia.
FIG. 6 is a circuit diagram adapted for use with the apparatus shown in FIGS. 1—3 inclusive.

Referring to FIG. 1 there is shown a cabinet 10 having a front panel 12 accommodating a volume control 14, tone control 16, automatic control button 18, protruding from slot 20, cartridge eject button 22, selector knob 24 for the continuous number of playings and window 26 providing visual access to needle 28, and program track indicia "1" to "4" therein. Appropriate labels are provided for each control means, the functions of which will be more completely described in relation to the cooperating parts. The unit is provided with a cartridge slot 30 in which is shown a cartridge 32 in playing position. Although the controls are shown to include rotative, sliding and reciprocating movements, other mechanisms can be used with which to make the adjustments, position the parts and indicate the conditions of operation therein.

Figure 2:
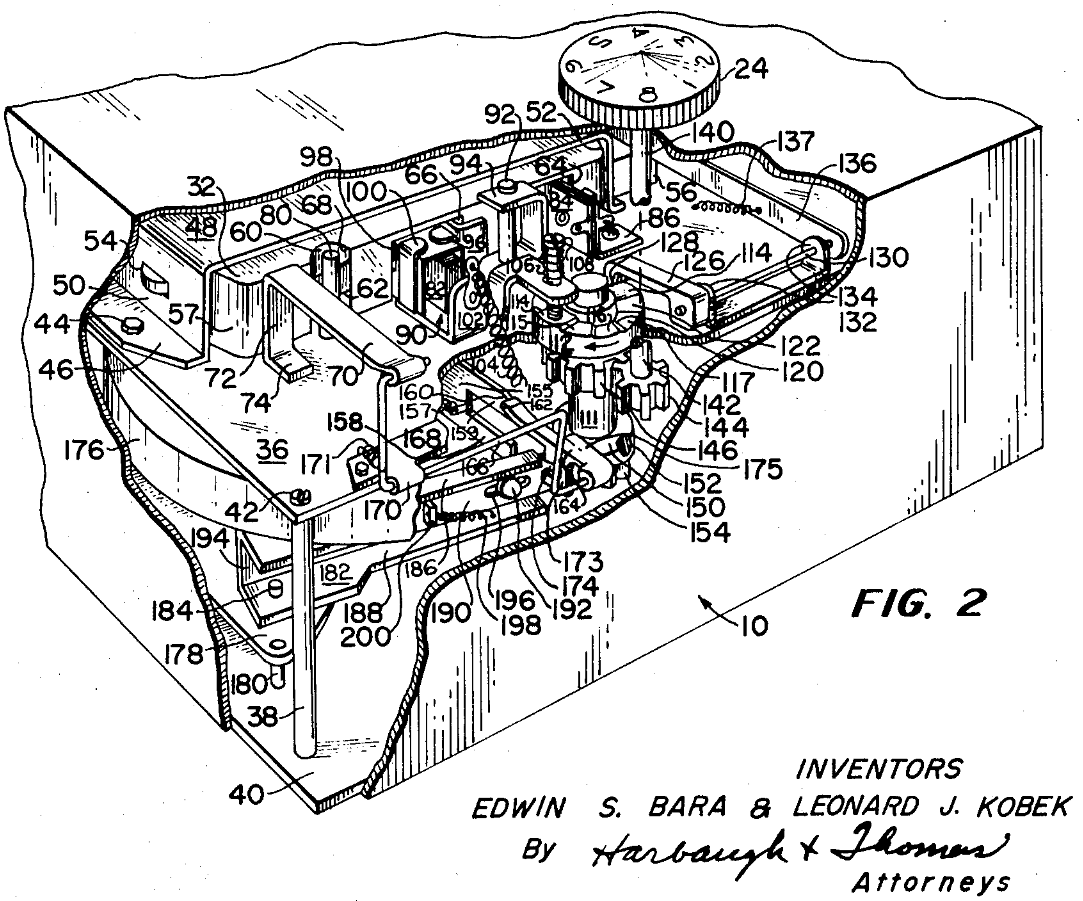
FIG. 2 is a perspective view taken from the back of the cabinet of FIG. 1, partially cut away to show the internal mechanism.

In FIG. 2 the cabinet 10 has been cut away to show, from the back of the machine, only those portions of the mechanism relating to this invention and omitting the appropriate circuitry, source of electric power, amplifier, audio and related components, which elements are omitted for simplicity and will be referred to generally in relation to FIG. 6. A supporting plate 36 is positioned horizontally within cabinet 10 by means of several pillars, one of which is illustrated at 38, affixed to the base 40, and held by means of the screw 42. Other means of providing a central support for the mechanism can be used.

The top plane surface of the plate 36 is in the same plane as the bottom edge of the cartridge slot 30 and provides support for the cartridge 32. To the front part of the plate 36 there is attached by means of bolt 44 through flange 46, a U-shaped housing member 48 which provides a guide and retaining means for the tape cartridge 32. The vertical walls 50 and 52 of the housing 48 provide means for supporting a ball or roller detent 54 (also shown in FIG. 6) as well as the main switch 56, the functions of which will be described.

The cartridge 32 may be any type of receptacle for tape adapted to retain a continuous tape i.e. a magnetic tape (about ¼" in width) carrying 4 to 8 channels or tracks in parallel continuous relationship therein, provided the cartridge has generally curved or angular back corners 57 and at least one notch 58 for engagement with the ball detent 54. Illustrative is the "Lear Jet Pak 8," a product of the International Tape Cartridge Corporation. A typical tape carried in such a cartridge will have a strip (about ⅝" in length) of conductive metal (aluminum) foil affixed thereto on its outer surface and positioned at the common end of each one track and the beginning of the next.

Insertion of such a cartridge 32 through the slot 30 of front panel 12 places same into the playing position shown in FIG. 2. Such a cartridge contains a continuous coil of tape within a particularly designed body cavity, one loop of which is threaded past the working edge (shown in FIG. 2) centrally of three spaced openings in the end face, over rubber idler 60, contained therein at the left hand corner and through a suitable rounded slot in the right hand corner. The tape 62 moves from the center of the coil, radially over the edge thereof through the rounded slot, past the opening 64, next past the opening 66 and finally past the opening 68 and around the idler 60 on to the outside of the internal coil (not shown). In its passage before the openings 64 and 66 (at a desired speed i.e., 3¾ in./sec.) the tape 62 engages a pair of spring-loaded felt shoes (not shown) which maintain the loop in satisfactory playing contact with the playing head 82 and a sensor head 84 at the openings of the cartridge. Since the cartridge itself forms no part of this invention aside from its function as a means for actuating the main switch 56, no further description is necessary.

As shown in FIG. 2 with the cartridge 32 in operative position for play the end of the cartridge is against the cartridge reject shoe 70, particularly against the leg 72 thereof, having a flat base 74, resting against the flat surface of the plate 36. In this position the tape 62 has been frictionally engaged between the idler 60 and the offset drive capstan 80, while the remaining portions of the tape are brought into operative registry with the pickup head 82 and the conductance detector or bridge 84. The pickup head 82 can be of any of the types known in the art adapted to perform the function of translating the magnetic remanence on the moving tape into an electrical signal operative to be transformed and amplified into sound. The function of the bridge 84 is to respond to the presence of the aluminum strip on the moving tape (heretofore described) and move the pickup head 82 to the next track or stop the machine, both by completing a circuit to be described. Several types of bridge devices are available in the art for this purpose. The bridge 84 is attached to the plate 36 by means of the bracket 86.

In accordance with one embodiment of this invention, the pickup head 82 is mounted so as to be movable vertically while in registry with the tape 62 with no angular movement and little or no horizontal movement, aside from resilient urging against the tape as it is held in place (a constant horizontal path) by the spring-loaded felt pads therebehind. This is accomplished in one form by the construction shown in FIG. 2 where the bracket 90 is slidably mounted on post 92 which depends upwardly from and is affixed to plate 36. The bracket 90 may take any of a variety of forms. In the embodiment shown this part is formed from a metal stamping, bent to form the U-shaped yoke 94, carried by the post 92 in nonrotating vertical sliding relationship. This can be accomplished by making the post 92 square or octangular in cross section and providing close-fitting aligned matching holes in the yoke 94. Alternately, the post 92 and the holes in yoke 94 may be round and a guide member 106 provided which is affixed to yoke 94 and provides a plane horizontal surface riding in guided relation against shaft 110. The guide member 96 may have an inwardly depending horizontal leg to form a corner (as shown) to engage the cartridge adjacent to the opening 66 and act as a safety stop member for the final positioning of the cartridge in play position.

The bracket 90 is movable vertically a distance approximately the width of the tape or ¼", in a plane, substantially parallel to the plane of the tape. The pickup head 82 is affixed in a protective housing 98, and contained thereon by means of tabs 100. An upstanding ear 102 provides a means of attachment for the spring 104 which is attached at its lower end to the plate 36 or other suitable stationary part of the housing 10, in order to bias the entire bracket 90 and the head 82 downwardly and keep yoke 94 from rotating on shaft 92. The force necessary for this purpose is not great so long as there is no tendency for the head to bounce or float and a smooth up and down motion is attained.

In order to provide a means of raising and lowering the head 82 and the bracket 90, it is provided with an offset tab member 106 carrying the vertical set screw cam follower 108 threadably engaged thereto. A retaining spring or locking collar may be provided on the set screw cam follower 108 for the purpose of maintaining its preset position within the tab 106.

Centrally located within the device is the vertical shaft 110 which is carried by the plate 36. This shaft may be adapted to rotate therein by provision of a bearing mount therethrough. Mounted on the shaft 110 is the stepped cylindrical cam 112 having the circumferential steps 114, 115 116 and 117 on the upper face thereof. These steps are defined by substantially equal segments of said cam, each having flat horizontal cam surfaces engageable in sequence with the bottom end of the set screw cam follower 108. The cam surfaces are separated one from the other by means of substantially equally dimensioned risers, i.e., 120. Each respective step represents or corresponds to the position of a track on the tape 62. Thus, for a 4-track tape, four successively lower steps would be provided. The return riser 122 leading to the step 114′ will be about the height of the distance between the four tracks on a ¼" unidirectional tape.

The back half of the stepped cam 112 has radially positioned steps corresponding to those shown on the front half and the same number of such steps and risers.

From this description it is seen that the rotation of the cam 112 causes the stepwise raising or lowering of the bracket 90 on the shaft 92 with corresponding positioning of the pickup head 82 adjacent to and in operative position to the respective tracks on the tape 62. A four-track tape is used for illustration only and any number of steps and corresponding risers can be provided on the cam 112 to accommodate tapes having different number of tracks.

Means are provided, in accordance with one embodiment of this invention, to indicate the relative position of the pickup head 82 in relation to the tape 62. In the embodiment shown a cam follower lever or pawl 126, the point 128 of which engages the steps and risers of cam 112, is provided. The pawl 126 affixed to the shaft 130 supported in rotational relationship by the bracket 132 by means of a pair of upstanding supports 134. Affixed to the other end of the shaft 130 is an elongated pointer 136, having needle 28 (see FIG. 1) affixed at right angles thereto at the forward end and adjacent to selection indicia "1" to "4" appearing in window 26. The stepwise rotation of the cam 112 in a clockwise direction as indicated by the arrow, causes the pawl 126 to drop into a first step, not shown, on the back side of the cam 112, while simultaneously the set screw cam follower 108 drops into the corresponding step 115 on the front side of the cam 112, causing the pickup head 82 to locate adjacent the second track and the needle 28 to come to rest adjacent indicia "2." In its next position the pawl 126 would drop into a step corresponding to step 116 on the back side of the cam 112. On the next one-half revolution of the cam 112, these functions are reversed, that is the cam follower 108 will begin from the step 114′ and the pawl 126 will start from the step 114. The weight of both the pawl 126 and the pointer 136 in conjunction with tension spring 137 maintain the former in contact with the cam while the difference in length and radial movement of the latter provide for readily visible scale divisions in the window 26, in addition to desired sensitivity and accuracy of registry.

Figures 3, 7:
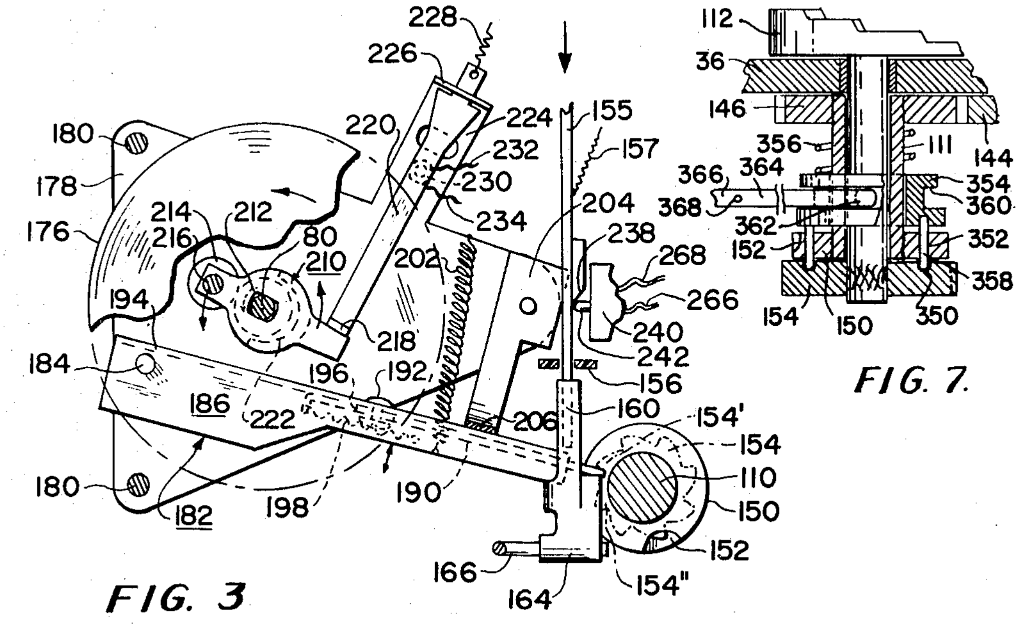
FIG. 3 is a top plan view showing part of the manual and automatic cartridge reject and track changing mechanism.
FIG. 7 is a partial cross-sectional view of one form of slip clutch and release means for operation during continuous play.

Means are provided in accordance with this invention to eject the cartridge 57 either manually or automatically, to automatically and selectively change the relative position of the pickup head 82 with respect to the tracks on the tape 62 and also to set the pickup head 82 at any desired track for the beginning of play of a tape or to play any desired track on the tape and automatically eject the cartridge at the end of play of that track. In one embodiment of this invention means are provided to control the number of times a selected track is played repetitiously. For this latter purpose, the shaft 140 (see FIG. 2), to which the counter knob 24 is affixed, extends through and connects to a second shaft 142, located in a vertical position and held by means of suitable bearings or mountings (not shown) affixed to plate 36. The connection between shafts 140 and 142 is omitted for simplicity of illustration and any means such as a pair of bevel gears or a universal joint at the connecting ends (shown by the broken line therebetween) can be used. The counter knob 24 bears the indicia '1" and '8" to illustrate that any selected track can be played one to eight times. The spur gear 144 engages the larger spur gear 146 which is affixed to the sleeve 111 encompassing the lower end of the shaft 110. The plate 36 through which the shaft 110 is rotatably mounted serves as a bearing support. The lower end of the sleeve 111 has affixed thereto a flange 150 having a notch 152 on its periphery. Immediately adjacent to the flange 150 and attached to the end of the shaft 110, for rotation therewith, is a ratchet 154. Any suitable means are provided between the collar and the ratchet 154 to allow the former to be rotated counterclockwise to the latter and be carried clockwise thereby upon rotation of the shaft 110. FIG. 7 to be described, illustrates a form of suitable means to accomplish this function.

Referring to FIG. 1, the cartridge eject button 22 is shown protruding from an aperture in the front panel 12. This button has two positions and is connected directly to the reject rod 155 (FIGS. 2, 3 and 6). Suitable Nylon guide member 156 (see FIG. 3) may be provided for ease in longitudinal movement of the rod 155 by means of finger pressure on the button 22. The spring 157 biases the rod 155 toward the front panel 12. The rod 155 is bifurcated having a lower arm 158 and an upper arm 159 with a beveled tip 160 thereon spaced from and engageable with the similarly but oppositely beveled tip 162 of the cartridge eject lever 164, which is rotatably mounted to one end of the lever crank 166. A bracket 168, affixed to the plate 36, rotatably supports the lever crank 166, by means of one or more bearing supports, such as the bearing 170. Because of the length of the horizontal shank of a lever crank 166, a bearing support, such as 170, would normally be provided at each end of the shank. A spring 171 attached to the lever crank 166 and to the plate 36 assures positioning of eject lever 164. The cartridge eject lever 164 has a downwardly depending shoulder 173 having a horizontal notch 174 on the forward edge. A second shoulder 175 rests on the top peripheral edge of the flange 150. When the notch 152 registers with the shoulder 175, the eject lever 164 is allowed to drop into a second operable position to be described.

Referring to FIGS. 2 and 3, the motor 172 drives the balanced flywheel 176 in a manner known in the art, said parts being supported by the plate 178, carried by the supports 180 located under the plate 36. The shaft (not shown) on which the fly wheel 176 rotates is directly connected at its upper end, as part thereof, to the driving capstan 80.

The view in FIG. 3 is shown with the plate 36 removed to reveal automatic means for causing the rotation of the shaft 110 and other functions. Immediately below the flywheel 176 an elongated pawl lever 182 is rotatably mounted on the pivot pin 184 affixed to the plate 178. The pawl lever 182 is formed with opposed, spaced, parallel flanges 186 and 188 (see FIG. 2), extending the length thereof or at least along the extended end of this lever. An elongated pawl 190 is slidably mounted between the opposed flanges 186 and 188, which act as horizontal guides therefore, by means of the pin 192, affixed to the wall 194 of the pawl lever 182. The pin 192 may be in the form of a rivet the enlarged head of which has a flat underside for sliding engagement with the flat surface of the elongated pawl 190. The flange 186 registers with the notch 174 of the eject lever 164 when the latter is held in its inoperative position by the collar 150 and strikes the shoulder element 173 when the notch 152 allows the reject lever 164 to drop into its operative position.

A slotted opening 196 in the sliding pawl 190 engages the pin 192 to allow the pawl to slide back and forth longitudinally, between the guide flanges 186 and 188. A silicone grease can be used between the back side of the pawl 190 and the wall 194 for free movement. A spring 198 is attached between the tab 200, on the end of the pawl 190, and the flange 182, for the purpose of urging or biasing the sliding pawl 190 to the right and radially from the pivot pin 184. The extended end of the sliding pawl 190 engages the teeth of the ratchet 154 affixed to the lower end of the shaft 110. A second spring 202 (FIG. 3) attaches between the back side of the pawl lever 182 and a stationary part of the cabinet, such as the plate 178. A stop member 204 having an upstanding leg 206 stops the counterclockwise rotation of the pawl lever 182. The spring 202 allows limited clockwise movement of the pawl lever 182, to index the lever 182 to correctly rotate ratchet 154.

By this arrangement the clockwise rotation of the pawl lever 182, against spring 202, around pivot 184 out of normal position, causes the sliding pawl 190 to move away from ratchet tooth 154'. At the same time the spring 198 slides the pawl radially outward, along the slotted opening 196, into a position of registry with the next ratchet tooth 154''. The return of the pawl lever 182 by means of the spring 202 in a counterclockwise direction, causes the sliding pawl 190 to carry ratchet tooth 154'' clockwise into the position formerly occupied by ratchet tooth 154', which action turns the shaft 110 one-eighth of a revolution, there being eight equally spaced ratchet teeth 154'. This action rotates the large spur 146 and in turn the small spur gear 144 and the play counter knob 24. In addition the cam follower 108 is brought into registry with the next cam step, such as 116, the pawl 126 is dropped into the corresponding step, on the back side of the cam 112, and the pointer 136 responds with needle 28 dropping to the next selection number.

The means for selective movement of the pawl lever 182, in the manner just described, are shown in more detail in FIG. 3 wherein the floating crank 210 is rotatably mounted on the capstan 80 by means of loose-fitting bore or slot 212. One arm of the floating crank 210 rotatably carries an idler wheel 214 on a shaft 216, while the other end engages the upright stop member 218 carried by the end of the catch lever 220. A journal 222 is positioned on the capstan 80 between the floating crank 210 and the housing 178 for flywheel 176. The journal 222 is affixed to and rotates with the capstan 80. The outer periphery of the journal 222 is out of frictional contact with the idler wheel 214 and while the unit is running in "ON" position, the idler wheel 214 is normally free of rotation. The floating crank 210 is frictionally urged to rotate with the flywheel 176 through an interengaging spacer washer (not shown) between them.

The catch lever 220 is supported by the protuberance 224 extending from the plate 178 by means of the upstanding slotted guide post 226 through which one end of the catch lever extends. A spring 228 is attached to the extended end of the catch lever 220 with the other end attached to a stationary part (not shown) of the cabinet. The spring 228 biases this extended end downwardly against the slotted guide post 226 which acts as a fulcrum tending to maintain the stop member 218 of the catch lever 220 in the plane on the floating crank 210, to register therewith (abut against) and prevent its revolution. The catch lever 220 is so positioned that a slight downward movement thereof against the spring 228 as by energization of a magnet 230 causes the stop member 218 to clear the floating crank 210.

By this action, the floating crank 210 is free to rotate counterclockwise around the capstan 80, due to the frictional urging of crank 210 on journal 222. This brings the idler wheel 214 into rolling contact with the wall 194 of the pawl lever 182 causing it to rotate clockwise on the pivot pin 184 against the bias of the spring 202. As long as the catch lever 220 is held downward the floating lever will continue to ride around the capstan 80 and trip the pawl lever 182 once for each revolution of the floating crank lever 210. The loose fitting bore 212, which may be in the form of a slot, causes some delay in the response of the floating crank 210 to the release by the catch lever 220. In addition the inertia of the crank 210 plus some lost motion due to the idler wheel 214 itself augments this delayed action. Each revolution of the floating crank 210 moves the pawl lever 182 in one oscillation which advances the ratchet 154 one tooth position clockwise.

The catch lever 220 can be raised to its inoperative position by any desired means i.e., mechanical or electrical. In a preferred embodiment of this invention provision is made for the electrical control of the catch lever 220 e.g. by means of the solenoid 230 mounted in operable position thereabove as shown in FIG. 3, and connected to electrical leads 232 and 234, which is adapted to create an electromagnetic field to attract the catch lever 220 and lower it to the operative position that is, to clear the floating crank 210. This solenoid can be located anywhere along the catch lever, as a matter of choice, or can have a movable core attached to the lever whereby the electromagnetic field causes the core to move and consequently lower the catch lever 218. The solenoid 230 need only be activated about one-tenth second to free the floating crank 210. The other end of the crank 210 and the shaft 216 do not engage the catch lever 218 in any position and pass thereby.

As previously stated, the eject rod 155, operated by the eject knob 22, has several functions including manual eject override and at least two operable positions. Referring to FIGS. 3 and 6, the relationship of these parts to the electrical system is shown. The eject rod 155 has a shoulder cam 238 engageable with the microswitch 240 through spring actuated plunger 242 as a means of electrical control. The switch 240 is normally in "OFF" position except when the cartridge eject button 22 is pushed inwardly to its first operative position, in which event the circuit is closed, and independent of the setting of the automatic control button 18, this action causes the solenoid 230 to be actuated and the track changed or the cartridge ejected.

Referring to FIG. 6 the electrical leads 250 and 252 (from an AC power source) connect through the switch 56 to the motor 172. The solenoid 230 is connected between power lead 252 and one pole of repeat switch 254 (normally closed) by means of the leads 232 and 234. The other pole of the repeat switch is connected by means of the lead 256 to one pole of the selector switch 258. The remaining pole of the selector switch is connected by the lead 260 back to the power lead 250. The bridge detector 84 is connected in parallel across the selector switch 258 by means of the electrical leads 262 and 264, while the microswitch 240 is bypass connected by means of the leads 266 and 268. The automatic control button 18 is operatively connected to insulated slide bar 270 adapted to be moved into three positions (1) in intermediate or "AUTO" position as shown in FIG. 6, wherein repeat switch 254 is closed and selector switch 258 is open, (2) in "REPEAT" position, wherein the slide bar 270 operates to open the repeat switch 254, while the selector switch 258 remains open, and, (3) in "SELECTOR" position, wherein the slide bar 270 operates to close the selector switch 258 while the repeat switch 254 is closed. The return spring 272 facilitates these functions so that the selector switch can remain in "REPEAT" or "AUTO" positions, but must be held in "SELECTOR" position. Other arrangements to accomplish these results and equivalent electrical components therefor are apparent to one skilled in this art which can be used without departing from the spirit of the invention.

FIG. 7 shows one form of clutch arrangement between the ratchet 154 and the collar 150. The shaft 110 carrying the cam 112, has the ratchet 154 affixed to the lower end thereof in supporting relationship for the assembly. The sleeve 111 is attached to the spur gear 146 at one end and to the collar 150 at the other end, these parts being rotatable about the shaft 110. The top surface of the ratchet 154 has a plurality of circumferentially spaced detents 350 therein. The number of such detents will correspond to the number of repetitious plays of a single track that are desired corresponding to the counter 24. The collar 150 has one or more bore holes 352 therethrough which are radially spaced from the center of the collar to coincide with each of the detents 350.

A floating collar 354 encompasses the sleeve 111 in sliding and rotating relationship and is urged downward against the top surface of the collar 150 by means of the light coil spring 356, which is positioned around the sleeve 111 between the spur gear 146 and the top of the floating collar. Extending from the under side of the floating collar 354 and affixed thereto are one or more pins 358 which pass in free sliding relationship through the bores 352 and extend sufficiently beyond the bottom of the collar 150 to engage each of the detents 350 in sequence. The detents can be shaped so as to engage the pins in only the clockwise direction of rotation of the collar 354.

The floating collar 354 has a continuous circumferential groove 360 around its outer surface which is slidably engaged by diametrically opposed pins 362 (only one being shown) affixed to the yoke 364, the bifurcations of which encompass and are spaced radially outward from the periphery of the floating collar 354. The yoke 364 is carried by the continuous play lever 366 and pivoted on the pin 368, held by a stationary part of the cabinet. The lever 366 extends in operable relationship to the front 12 of the cabinet 10 through a suitable slot 370 (FIG. 1) so that when depressed the yoke 364 and the floating collar 354 are raised against the spring 356 to disengage the pin 358 from a detent 350. This allows the counter 24 to be rotated, thus turning the gear 146 and the sleeve 111 along with the collar 150 to place the notch 152 a desired number of incremental turns of the ratchet 154 from the point of registry of the shoulder 175 therewith.

AUTOMATIC PLAY OF 4-TRACK TAPE

The play counter knob 24 determines the number of times a given point on the tape passes the head, regardless of the track number with which it starts. Assuming that the track indicator 28 is set at No. 1 and it is desired to play six recordings, (tracks 1 to 4 plus 1 and 2 again on a four track tape), the knob 24 is turned to register the numeral 6 adjacent suitable indicia on the front panel. Rotation of the knob 24 turns the shaft 142; the gears 144 and 146 having a 2 to 1 ratio; the hub 111 of the gear 146; and, the flange 150 carried by the hub 111 and thereby the ratchet teeth located on the bottom of the wheel 154. This occurs without turning the step cam 112 which at that setting has the follower 108 resting on the No. 1 track or topmost step 114 supporting the pickup head 82 in position to play the No. 1 track on tape 62.

The cartridge 32 is inserted into the cartridge slot 30. As the cartridge is moved inwardly, it first trips the microswitch 56 to start the capstan 80 rotating counterclockwise and secondly, as the tape contacts the rotating pickup, the cartridge is locked in position by detent 54. The No. 1 track on the tape begins play through the amplifier and audio circuits which are controlled by the switch 56.

The track No. 1 continues to play until the aluminum foil conductor on the tape, at the end of track No. 1, comes in contact with bridge 84. This closes the circuit through the leads 262 and 264, through the repeat switch 254 and the leads 234 and 232 to actuate the solenoid 230. The catch lever 220 is thereby lowered, releasing the floating crank 210 whereby the idler wheel 214 trips the pawl lever 182. By this time the bridge circuit has been broken by the passage of the aluminum conductor on the tape beyond the bridge 84 and the catch lever 220 is ready to catch the stop member 218 on the floating crank 210 on its next pass. For each operation of the bridge 84, the floating crank 210 makes one revolution. As a consequence the pawl lever 182 is tripped by the idler 214 and the sliding pawl 190 advances the ratchet 154 one notch. By these means the pickup head 82 is dropped to track No. 2 and needle 28 registers with indicia "2". The play of track No. 2 begins and these operations are repeated until the last track is played, at which time the notch 152 has been rotated into position with the shoulder 175 on the eject lever 164 dropping this lever so flange 186 is opposite the shoulder 173. Then when the aluminum strip again trips the bridge 84 and the solenoid 230 operates, the rotating of the pawl lever 182 causes the flange 186 to strike the shoulder of the eject lever 164. The crank 166 is thereby rotated and the shoe 70 is thrust against the cartridge 32, pushing same part way out of the slot 30. This movement is sufficient to release the switch 56 and shutoff the machine. Since only one notch 152 has been provided on the collar 150, the machine, as illustrated, with eight ratchet teeth 154 on the shaft 110 will count down and play a four track tape twice and then shut itself off. At the end of the play the cartridge protrudes sufficiently from the slot 30 for manual removal.

REPEAT PLAY OF A SELECTED TRACK

At any time during the play of a tape or at the initiation of play, the control 18 can be moved to "REPEAT" position. This inactivates the bridge 84 and its control of the solenoid 230. Under these conditions a single track of the tape will be played continuously until either control 18 is returned to "AUTO" position, or switch 56 is inactivated by physically removing the cartridge 32, or the selector 20 is actuated to move the pickup head to the next track.

SELECTIVE PLAY OF DIFFERENT TRACKS

When the machine is in operation, playing for example, track No. 2, and it is desired to play another track e.g. track No. 3, this change can be accomplished by moving the control 18 momentarily to "SELECTOR" position. This closes the switch 258 and actuates the solenoid 230, tripping the pawl lever 182 and automatically sets the pickup head 82 at the next track or track No. 3. This action of the return spring 272 assures that the control 18 does not remain in "SELECTOR" position unless so held, and returns to "AUTO" position on being released. As long as the control 18 is in "SELECTOR" position the machine will continue to cycle and change the pickup head 82 to successive tracks each indicated in turn by the position of the needle 28.

At any time during the operation of the machine the cartridge eject button 22 can be used to eject the cartridge 32 and stop the machine. As the button 22 is pushed inwardly its first position closes the switch 240 and simultaneously the cam 160 raises the eject pawl 164 so that the flange 186 registers with the shoulder 173, i.e. the flange is either above or below the notch 174 as desired depending on the design. As the solenoid 230 is actuated and the pawl lever 182 swings clockwise, the flange 180 engages the shoulder 173 and the crank 166 is turned, pushing the cartridge eject shoe 70 forward against the cartridge. The cartridge 32 is thereby moved sufficiently out of the slot 30 to pass the detent 54, to release the switch 56, and allow the leading edge of the cartridge to be gripped by hand and totally removed.

If desired, in the event that the electric power is cut off, the cartridge ejection button 22 can be pushed further inward to a second position to manually eject the cartridge 32. By this action the eject rod 155, (FIG. 3) is moved further rearward raising lever 164 (FIG. 2) and the bifurcation 158 strikes the back of the pawl lever 182 driving it against the shoulder element 173 to manually actuate the cartridge reject shoe 70. When the eject button 22 is in its released position the eject pawl 164 rests on the collar 150.

Figure 4:
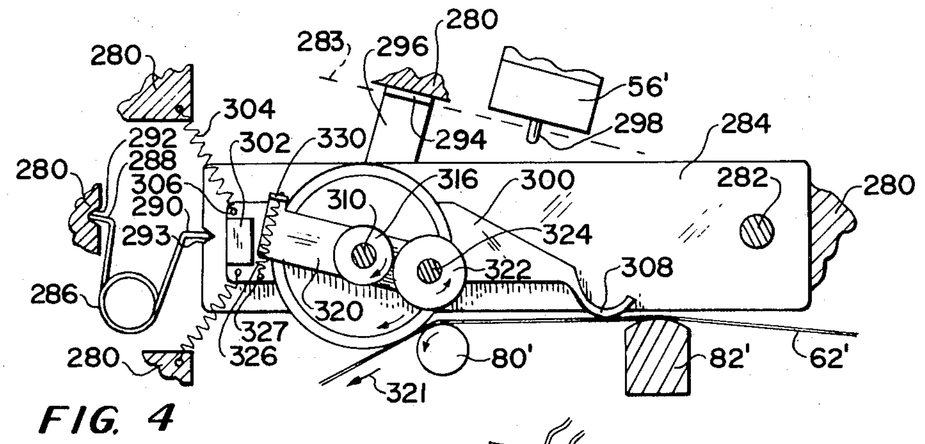
FIG. 4 is a top plan view of one form of automatic shutoff for use particularly with a reel type tape machine.

In one embodiment of this invention the trip mechanism shown in FIG. 3, is applied, with some modifications, to a discontinuous tape or reel type machine, such as a tape recorder or a computer. Referring to FIGS. 3 and 4, there is shown an illustration of one such embodiment. Stationary parts of the cabinet are illustrated at 280 and the reel tape is shown at 62' traveling from right to left past the pickup head 82' as driven by the capstan 80' and idler 312 in the direction of arrow 321 in cooperation with takeup reel (not shown) to wind up the tape. The pickup head 82' may be mounted for parallel movement in relation to the tape as described in FIG. 2. A first pin 282 is affixed to a stationary part of the cabinet and carries the trip or toggle lever 284 in rotational relationship. The coil spring 286 has its ends 288 and 290 engaged between notches i.e., the notch 292 in the stationary part of the cabinet 280 and the notch 293 in the movable end of the toggle lever 284. Other means of attachment of the spring 286 can be used to give the trip lever 284 an overcenter toggle action. A stop member 294, held by stationary plate 296 secured to a stationary part 280 is engageable with the upper edge of the toggle lever 284 limiting clockwise movement. The main switch 56' has a spring-loaded contact 298 in the same plane as the tab 299 on the toggle lever 284. In normal operative position the spring 286 holds the trip toggle lever 284 toward the tape 62' with operating tension thereon. In deactivated position shown by the dotted line 283 in (FIG. 4) the toggle lever 284 moves away from the tape 62' and the tab 299 opens the switch 56.

A finger lever 300 balanced by counterweight 302 is carried intermediate the end of the toggle lever 284 by means of the pivot pin 310. The spring 304 is attached between a stationary part of the cabinet and the corner 306 of the finger lever 300, sufficiently spaced from the pivot pin 310 to be stretched and urge the curved feeler 308 against the tape 62' with only slight pressure when the lever 300 is moved to its operative position, and another spring 305 attaches at the other corner to stretch and urge counterclockwise movement of the lever 300 to clear the tape path when the toggle lever 284 is in nonplaying position. The shaft 310 is attached to toggle lever 284 at a point intermediate the ends of the finger lever 300 and also rotatably carries the idler wheel 312 thereon. The shaft 310 has a preferably nonrotating sleeve 316 thereon and pivoted on the shaft 310 between the sleeve 316 and the idler wheel 312 is a pinch lever 320. A pinch wheel 322 is rotatably mounted on a pin 324 on lever 320 and has its circumferential surface in frictional engagement with the sleeve 316. A spring 326 attaches between the finger lever 300, at a point 327 diametrically opposite point 306 on the finger lever 300, and the end of the pinch lever 320 opposite the pinch wheel 322. The sleeve 316, the pinch wheel 322 and the end of the capstan 80' are all in a plane to one side of the edge of the tape 62'. The spring 326 urges the pinch lever 320 counterclockwise on the shaft 310 so that the stop member 330 at the end of the pinch lever 320 contacts the top edge of the finger lever 300. The idler wheel 312 impinges firmly against the tape 62' and holds the tape in driving relationship against the driven capstan 80' so that the tape is drawn past the pickup head 82' in the direction of the arrow 321. Where alternately driven reels are used to carry the tape through the machine, the capstan 80' can be a nondriven or idler wheel.

Figure 5:
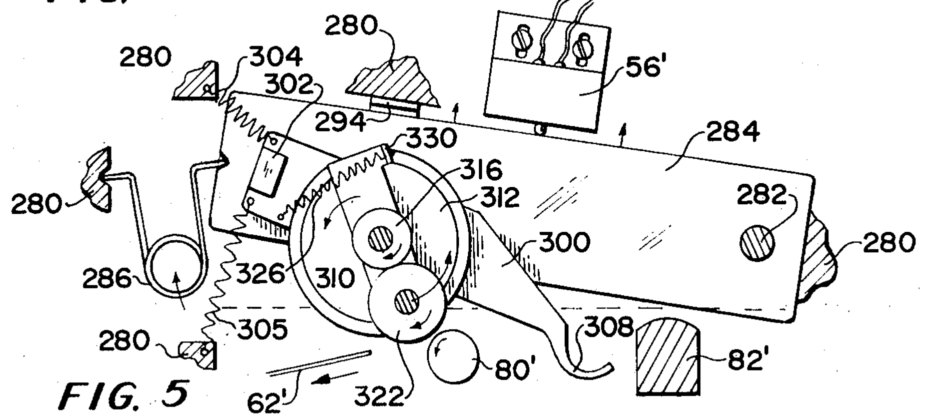
FIG. 5 is a view of the mechanism of FIG. 4 showing the relative position of parts during shutoff.

In the event the tape ends, breaks or accidentally slacks off from either of its reels (not shown), as illustrated in FIG. 5 the curved feeler 308 of the finger lever 300 is released and allowed to move clockwise under the action of the spring 304. A frictional engagement of the pinch wheel 322 against the capstan 80' is thereby established and tends to rotate the pinch lever 320 clockwise on the shaft 310 against the spring 326. This moves the shaft 310 and toggle lever 284 clockwise about pivot 282 and moves the pinch wheel 322 into contact with the capstan 80'. The capstan 80' rotates the pinch wheel clockwise to run around the sleeve 316 and this thrusts the shaft 310 away from the capstan to permit the pinch roller to pass between the capstan and the sleeve 316. This further rotates the pinch lever 300 against the spring 326 and the force is transmitted against the pin 310 to drive the toggle lever 284 against the coil spring 286 past its dead center and to snap over center against the stop 294. The switch 56' is turned off with the toggle lever in the dotted line position of FIG. 4.

As the toggle lever 284 moves past its dead center position, the idler wheel 312 also clears the capstan 80' and the spring 326 returns the pinch lever 320 to its normal position on the finger lever 300 with the stop member 330 against the edge of the finger lever. Simultaneously, the spring 305 returns the finger lever 300 to an intermediate position on the toggle lever 284. The toggle lever 284 and the finger lever 300 are manually placed in the position shown in FIG. 4 during play of the tape it only being necessary to move the latter counterclockwise slightly from its intermediate position as the tape is threaded. During rewind of the tape in a reel-type machine the toggle lever 284 is in the position shown in FIG. 5 with the finger lever 300 in its returned position therein as shown in FIG. 4. This moves the idler 312 away from the capstan 80' while the right hand reel takes up the tape again through the actuation of a rewind switch (not shown) overriding the main switch 56'. The toggle lever 284 with the finger lever 300 in the position shown in FIG. 4 is then moved back counterclockwise to place the idler 312 against a tape after the tape has been threaded into the machine.

The pinch rollers or wheels 214 (FIG. 3) and 322 (FIGS. 4 and 5) are made of resilient material such as rubber or soft tough plastic so as to function in the manner described and impart the necessary frictional engagement to pass between and spread the respective rotating or movable parts. The diameter of the pinch wheel 214 will be sufficiently greater than the distance between the back 194 of the pawl lever 182 and the tangential point on the journal 222 to cause lever 182 to rotate clockwise about pivot 184 sufficiently to move the pawl 190 from notch to notch on ratchet 154. Similarly, the diameter of the pinch wheel 322 will be sufficiently greater than the shortest distance between the peripheries of the journal 316 and the capstan 80' to trip the toggle lever 284.

From the foregoing description it is apparent that this invention has several features and cooperative functions brought about by closely interrelated parts. The main control of the "ON" and "OFF" positioning of the machine is governed by the tape cartridge with the detent guide and lock-in-place mechanism, with the main switch 56 "ON" before the cartridge is in full detent position. A multiple (four or eight) position manual pickup head-shifting mechanism is provided along with a parallel automatic head-shifting mechanism. Means are provided to automatically eject the cartridge and shut off the machine after one or more of the tracks have been played. Means to allow the repetitious play of one track as desired is provided in cooperation with means to partially eject the cartridge and shutoff the machine at the end of a predetermined number of plays. Visual indicia are incorporated to show the track that is playing and the next track to be played. The pickup head can be shifted to a desired track with the machine in "ON" position.

This invention contemplates and includes a fully automatic mode of operation wherein it is only necessary to set the selector, push the cartridge into the machine and adjust the tone and volume, to play all tracks sequentially on the tape. In this automatic mode, when the last play track is played, the unit will be shut off, the cartridge partially ejected and the pickup head will have been returned to the next play position. Or, as desired, the head automatically shifts back to No. 1 position and the unit continues to play the tape for a second time. Any time during play the pickup head can be moved to the next track by pushing the control 18 to the "Selector" position. This action can be repeated to sense the subject matter on each track for selection of a desired track or corresponding portion of the tracks on the tape. Furthermore, an overriding mechanical assist is provided which parallels the automatic cartridge ejector, to allow the unit to be shut off at any time with partial ejection of the cartridge. The repeater control is advantageous for using the unit in the class room or in inducing sleep or learning a foreign language.

The necessity of using power-operated clamp means to hold the cartridge in place within the tape-operated device is eliminated in the device of this invention. By using a comparatively heavy flywheel in combination with the offset capstan of small relative diameter, the device can operate at a higher r.p.m., and take advantage of the increased inertial and driving actions of the flywheel, so that the cam, ratchet and step-clutch means function easily and smoothly under lower voltage requirements. This assures the safe positioning of the foil detector after cartridge eject and elimination of noise and arcing between electrical contacts in all phases of operation. More uniform and reliable pull of the tape across the pickup head is attained by positioning the offset drive capstan so that the angle included between the plane of the incoming tape and the plane including the centers of the capstan 80 and the idler 60 is less than 90° and no smaller than 45°.

While this invention has been illustrated and described in relation to a preferred form of construction and relationship of parts, the invention is not so limited, and variations and modifications may be made without departing from the scope of the invention.

We claim:

1. In a tape-operated device wherein a tape is moved longitudinally therethrough in operative relationship with a signal-responsive element by means of a rotating motor driven member, the combination of:

1. crank means responsive to rotative engagement with said driven member and adapted to be directionally biased thereby;
2. means movable to a first position for holding said crank means against said directional bias;
3. means for releasing said holding means to move same into a second position whereby said crank means is moved by said driven member; and
4. means responsive to and engaged by said crank means to control a function of said device including the registry of said signal-responsive member with said tape.

2. A tape-operated device in accordance with claim 1 in which the means responsive to the rotation of said crank means comprises means to move said signal responsive element transversely to and from selected longitudinal signal tracks on said tape.

3. A tape-operated device in accordance with claim 2 including in combination:

1. a bracket supporting said signal responsive element for movement on a transverse axis across and in resilient contact with said tape; and
2. means for moving said bracket stepwise on said transverse axis and mounted for engagement by said crank means upon release of said holding means.

4. A tape-operated device in accordance with claim 3 in which:

1. said means for stepwise movement of said bracket comprises a stepped cam supporting said bracket;
2. a shaft rotatably supporting said stepped cam;
3. a ratchet affixed to said shaft and rotatable therewith;
4. a pawl-lever pivotally mounted in the path of said rotative means with one end engaging said ratchet; and
5. means biasing said pawl-lever toward said crank means whereby release of said holding means allows said crank means to engage said pawl-lever and move said bracket and signal-responsive means along said transverse axis.

5. A tape-operated device in accordance with claim 4 in which:

1. said rotative means comprises a crank arm mounted intermediate its ends on a slotted journal on said driven member;
2. second journal means rotatively carried by said driven member in frictional engagement with said crank arm;
3. a pinch roller on one end of said crank arm and having its periphery normally spaced from and in the plane of the periphery of said second journal, whereby on release of said holding means said crank arm is rotated by said journal carrying said pinch roller into contact with said pawl-lever and into contact with the periphery of said journal to displace said pawl-lever against said biasing means and advance said ratchet.

6. A tape-operated device in accordance with claim 4 in which:

1. said cam has a series of radially extending plane cam surfaces each separated from the next by a sloping cam riser, said cam risers corresponding in height to the transverse spacing of the tracks on said tape, said series of cam surfaces and risers extending substantially along one-half of the circumference of said cam and the series being repeated along the remaining half of the cam.

7. A tape-operated device in accordance with claim 6 including:
1. indicia for the respective tracks on said tape;
2. a pivoted pointer having one end in juxtaposition to said indicia; and
3. a cam follower on the other end of said pointer, said cam follower engaging in turn respective cam surfaces on one-half of said cam corresponding to tracks on said tape registered by the diametrically opposite cam surface supporting said bracket.

8. A tape-operated device in accordance with claim 1 in which the crank means responsive to the rotation of said rotative means to control a function of said device comprises means to move said tape out of operative contact with said signal responsive element.

9. A tape-operated device in accordance with claim 8 for use with a multitrack continuous magnetic tape coiled in a cartridge adapted to feed a loop thereof across guide means at an open end of said cartridge, having a housing to receive said cartridge with said loop of tape in operative relationship with said signal responsive element wherein:
1. means are provided to resiliently hold said cartridge with said housing;
2. said means to move said tape out of operative contact comprises a cartridge eject shoe in juxtaposition with the inner end of said cartridge;
3. a crank arm connected to said eject shoe;
4. an eject lever connected to said crank arm;
5. and means holding said eject lever in the path of said crank means whereby release of said holding means causes ejection of said cartridge.

10. A tape-operated device in accordance with claim 9 in which:
1. said crank means is connected to an inertial flywheel carried by said motor-driven member; and
2. means are provided to return said holding means to the first position.

11. A tape-operated device in accordance with claim 9 including means overriding said crank means to engage said crank arm for mechanical ejection of said cartridge.

12. A tape-operated device in accordance with claim 1 in which the means responsive to the rotation of said crank means comprises:
1. means responsive to the tension of said tape as same is moved longitudinally by said driven member and adapted to shutoff the power to said motor-driven member upon release of said tension.

13. A tape-operated device in accordance with claim 12 including as said tension responsive means the combination of:
1. a toggle lever pivotally mounted at one end in the plane of said tape;
2. an overcenter toggle spring at the other end of said toggle lever;
3. a pivot shaft mounted intermediate the ends of said toggle lever;
4. a finger lever mounted intermediate its ends on said pivot shaft, one end of said finger lever being registerable with a portion of said tape contiguous to said signal responsive element, the other end of said finger lever being resiliently balance-mounted in both directions of its plane of rotation;
5. a journal on said pivot shaft;
6. an idler wheel carried by said journal and rotatable therewith, the periphery of said idler wheel impinging said tape against said driven member to carry said tape in operative relationship with said signal responsive means and said idler wheel having a radius greater than said journal;
7. a pinch lever carried on said journal and rotatable therewith;
8. a stop member on one end of said pinch lever engageable with said finger lever;
9. means biasing said stop member into engagement with said finger lever;
10. a pinch wheel at the other end of said pinch lever having its periphery in the plane of and spaced from said journal, the diameter of said pinch wheel being slightly greater than radial difference between said idler wheel and said journal whereby said finger lever is held in registry with said tape in a first position of said toggle lever, and release of said registry allows said pinch wheel to rotate into a position between said journal and said driven member and thereby trip said pinch lever against said biasing means to force said toggle lever to a second position; and
11. switch means registerable with the second position of said toggle lever to control the electric power to said motor driven member.

14. A tape-operated device in accordance with claim 9 in which:
1. said eject lever is horizontally disposed and has a shoulder intermediate its ends;
2. said means for holding said eject lever in the path of said crank means comprises a rotatable collar having its periphery in supporting relationship with said shoulder;
3. a notch in the periphery of said collar and registerable with said shoulder in one position about its axis;
4. means engaged by said crank means to incremently rotate said collar; and
5. counter means to independently rotate said collar and set said notch a prescribed incremental radial distance from said shoulder whereby the continuous play of a selected track on said tape occurs until registry of said shoulder with said notch allows said reject lever to drop in the path of said crank means.

15. A tape-operated device in accordance with claim 14 in which:
1. said means engaged by said crank means to incremently rotate said collar comprises a pawl lever pivotally mounted in the path of said crank means;
2. a ratchet engaged by said pawl lever and supporting said collar;
3. a step clutch between said ratchet and said collar; and
4. means to disengage said step clutch and said counter means whereby to continuously play a selected track on said tape.

16. A tape-operated device in accordance with claim 1 for use with a multitrack continuous magnetic tape coiled in a cartridge adapted to feed a loop thereof across guide means at an open end of said cartridge, having an idler wheel at the return end of said loop in which:
1. said driven member comprises a capstan;
2. an inertial flywheel driving said capstan;
3. a housing to receive said cartridge with said loop of tape impinged between the capstan and said idler wheel in driving relationship therethrough; and
4. the plane of said tape intersects an angle around said capstan with the plane including the centers of said idler wheel and said capstan of less than 90° and greater than about 45°.

17. A tape-operated device in accordance with claim 1 in which:
1. the means for holding said crank means in a first nonrotative position comprises a catch lever pivotally mounted with one end thereof movable between said first and second position;
2. electromagnetic means to move said catch lever to said second position;
3. switch means to selectively connect said electromagnetic means to a source of electric current; and
4. electrical bridge means affixed in juxtaposition to said tape and adapted to detect a conductor means on said tape at the common end and beginning of tracks thereof; said bridge means being connected in series with said switch means to said source of electrical current.

18. A tape-operated device in accordance with claim 17 in which said switch means includes:

1. a main switch engaged by said cartridge to connect said current source to said drive motor simultaneously with the operative positioning of said cartridge in said device;
2. a second switch connected in parallel with said electrical bridge means and in series with said electromagnetic means; and
3. a three-position selector switch connected between said electromagnetic means said electrical bridge means and said main switch whereby during the operation of said device in a first position of said switch said bridge means is series connected with said electromagnetic means, in a second position said bridge means is disconnected from said electromagnetic means and in a third position said current source is independently connected to said electromagnetic means.

19. A tape player adapted to automatically play the successive parallel tracks on a multitrack cartridge-contained magnetic tape both sequentially and repetitiously, said cartridge having an open end and means to continuously feed and recoil a loop of said tape thereby over an idler wheel, said tape having a conductance element at the common beginning and end of said tracks comprising in combination:

1. means to receive said cartridge and resiliently retain same with said loop of tape in play position;
2. a movable pickup head and a stationary bridge element in operable contact with said loop of tape in play position;
3. motor-driven inertial means carrying a driving capstan on a common axis therewith, said driving capstan being offset in relation to said idler wheel in the open end of said cartridge whereby said tape passes onto a segment of said capstan before passing around said idler wheel into said recoil position;
4. switch means engaged by said cartridge in play position to connect said motor-driven inertial means to a source of electric current;
5. means responsive to said inertial means to eject said cartridge said means being engaged by an inner end of said cartridge in play position;
6. means to selectively connect said inertial means to actuate said cartridge eject means;
7. stepped cam means responsive to said inertial means to move said pickup head from track to track on said tape;
8. switch means responsive to said conductance element to connect said means to move said pickup head with said inertial means;
9. means to selectively disconnect said means to move said pickup head for a predetermined number of repetitious plays of a single track of said plate tape;
10. means to indicate the relative position of said pickup head with respect to said tape; and
11. means to indicate the number of said repetitious plays plays.

20. In a tape player adapted to automatically play the successive parallel tracks on a multitrack cartridge-contained magnetic tape both sequentially and repetitiously, said cartridge having an open end and means to continuously feed and recoil a loop of said tape thereby over an idler wheel, said tape having a conductance element at the common beginning and end of said tracks the combination comprising:

1. a housing to receive said cartridge and resiliently retain same with said loop of tape in play position;
2. a movable pickup head and a stationary bridge element in operable contact with said tape in play position;
3. a motor driven fly wheel carrying a driving capstan on a common axis therewith, said driving capstan being offset in relation to said idler wheel in said cartridge so that said tape passes onto said capstan before passing around said idler wheel into its recoiled position within said cartridge;
4. switch means engaged by said cartridge in play position to actuate said motor-driven flywheel;
5. a cartridge eject shoe engaged by an inner end of said cartridge in play position, and adapted to move said cartridge out of play position and disconnect said switch means;
6. crank means connected at one end to said cartridge eject shoe,
7. a floating eject lever pivotally connected at one end to the other end of said crank means, said eject lever having an upwardly beveled tip at the other end, an offset guide shoulder intermediate its ends and a downwardly depending notched flange;
8. a rotating journal on said capstan frictionally engaging a floating crank arm carried adjacent thereto by a slotted journal;
9. a pinch roller on one end of said crank arm in the plane of said rotating journal and normally having its periphery spaced from said journal;
10. stop means registerable with the other end of said floating crank arm in one position with electromagnetic means to move said stop means out of said position of register;
11. a pawl lever pivotally mounted at one end in the plane of rotation of said pinch roller with means biasing said pawl lever toward said pinch roller and against a stop member;
12. a sliding pawl carried at the other end of said pawl lever with means biasing said sliding pawl radially outward from said end of said pawl lever, said pawl lever being registerable with the notch in the flange of said floating eject lever in play position;
13. means for moving said pickup head in a plane transverse said tape comprising a bracket therefor slidably mounted on a shaft parallel to the surface of said tape with means urging said bracket downwardly, an adjustable cam follower on said bracket, said cam follower engaging a stepped cam having cam surfaces generally perpendicular to the surface of said tape, each of said cam surfaces corresponding to a longitudinal track thereof, a shaft rotatably supporting said stepped cam at one end with a ratchet wheel affixed to the other end thereof, said ratchet wheel being stepwise engageable by said sliding pawl of said pawl lever on each release of said stop member, a collar on said shaft adjacent said ratchet supporting on its periphery said shoulder of said floating eject lever, a recess in said collar adapted to release said eject lever so that the said pawl lever engages said flange thereof;
14. a circuit including said bridge means and said electromagnetic means in series, said bridge means adapted to sense said conductance element on said tape and actuate said electromagnetic means and switch means to disconnect said series connection from said current source in one position for repetitious play of a single track and connect said bridge and electromagnetic means in a second position to move said pickup head so as to play said tracks sequentially; and
15. means to selectively rotate said collar to register said recess with said shoulder of said eject lever after a desired number of repetitious plays of a single track and thereby stop said device and eject said cartridge.